(12) United States Patent
Isahagian et al.

(10) Patent No.: US 11,475,032 B2
(45) Date of Patent: Oct. 18, 2022

(54) ANALYZING MULTIDIMENSIONAL PROCESS TRACES UNDER EDIT-DISTANCE CONSTRAINT

(71) Applicant: International Business Machines Corporation, Armonk, NY (US)

(72) Inventors: Vatche Isahagian, Belmont, MA (US); Vinod Muthusamy, Austin, TX (US); Phuong Nguyen, Los Gatos, CA (US); Aleksander Slominski, Riverdale, NY (US); Bishwaranjan Bhattacharjee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 16/352,025

(22) Filed: Mar. 13, 2019

(65) Prior Publication Data

US 2020/0293540 A1    Sep. 17, 2020

(51) Int. Cl.
*G06F 16/25* (2019.01)
*G06F 16/28* (2019.01)
(Continued)

(52) U.S. Cl.
CPC ........ *G06F 16/254* (2019.01); *G06F 16/2246* (2019.01); *G06F 16/285* (2019.01); *G06F 16/9035* (2019.01); *G06F 16/90348* (2019.01)

(58) Field of Classification Search
CPC ............. G06F 16/254; G06F 16/90348; G06F 16/285; G06F 16/2246; G06F 16/9035
(Continued)

(56) References Cited

U.S. PATENT DOCUMENTS 7,933,915 B2 * 4/2011 Singh .................. G06F 16/9024
711/161
9,465,857 B1 * 10/2016 DeLand ................ G06F 16/285
(Continued)

OTHER PUBLICATIONS

Song, et al., "Mining Summaries for Knowledge Graph Search," 2016 IEEE 16th International Conference on Data Mining and Data Engineering, Barcelona, Spain, Dec. 12-15, 2016, (ICDM), 10 pages.
(Continued)

*Primary Examiner* — Giovanna B Colan
(74) *Attorney, Agent, or Firm* — Scully, Scott, Murphy & Presser, PC; Daniel P. Morris, Esq.

(57) ABSTRACT

A method, system and computer program product for analyzing multidimensional data are disclosed. In embodiments, the method comprises obtaining an original set of data having a sequential order and multiple original dimensions; selecting a topic-based summarization scheme to summarize the original set of data; and applying the selected topic-based summarization scheme to the original set of data to transform the original set of data into a new set of data having fewer dimensions than the original set of data, while preserving, within a defined measure, the sequential order of the original set of data. In embodiments, the selecting a topic-based summarization scheme includes selecting a plurality of topics, each of the topic representing a set of the original dimensions. In embodiments, the applying the topic-based summarization scheme includes performing dimensionality reduction on the original set of data to transform the original dimensions to the topics.

16 Claims, 12 Drawing Sheets

(51) Int. Cl.
*G06F 16/22* (2019.01)
*G06F 16/903* (2019.01)
*G06F 16/9035* (2019.01)

(58) Field of Classification Search
USPC .......................................................... 707/602
See application file for complete search history.

(56) References Cited

U.S. PATENT DOCUMENTS

2011/0087668 A1* 4/2011 Thomas ................ G06F 16/355
  707/738
2018/0357262 A1* 12/2018 He ...................... G06F 16/2282

OTHER PUBLICATIONS

Lefevre, et al., "GraSS: Graph Structure Summarization," Proceedings of the 2010 SIAM International Conference on Data Mining, Columbus, Ohio, USA, Apr. 29-May 1, 2010, pp. 454-465, Society for Industrial and Applied Mathematics, 2010.

Rudolf, et al., "SynopSys: Large Graph Analytics in the SAP HANA Database through Summarization," First International Workshop on Graph Data Management Experiences and Systems, New York, NY, USA, Jun. 2013, ACM, 2013, 6 pages.

Xiao et al., "EdJoin: An Efficient Algorithm for Similarity Joins With Edit Distance Constraints", http://www.cse.unsw.edu.au/~lxue/paper/vldb08_chuan.pdf, VLDB '08, Aug. 24-30, 2008, Auckland, New Zealand, Copyright 2008 VLDB Endowment, ACM 0000000000000, 12 pages.

Huong, "Ed-Join: An Efficient Algorithm for Similarity Joins With Edit Distance Constraints", U065131H Department of Computer Science School of Computing National University of Singapore, Undergraduate Research Opportunity Program (UROP) Project Report, 2008/2009, https://pdfs.semanticscholar.org/11eb/8983b3f7036b57d4b63da852ef655426e48e.pdf?ga=2.138548981.739151065.1552495398-2010836585.1477931328, published 2009, 39 pages.

* cited by examiner

EXAMPLE 1 - A LOAN APPLICATION PROCESS AND A SAMPLE TRACE

| ACTIVITY | SECTOR | RESPONSIBLE |
|---|---|---|
| PULL WAFERS | CONTROL | A |
| RECORD WAFER IDs / ATTACH WAFER ID MAP | CONTROL | A |
| INITIATOR COORDINATION | INIT ATTN | A |
| LAMP DEGAS IN CHAMBER E | METAL | B |
| SPUTTER ETCH IN CHAMBER D | METAL | B |
| LOW STRESS 10 kW TaN - Rs MONITOR | METAL | B |
| LAMP DEGAS IN CHAMBER E | METAL | B |
| SPUTTER ETCH IN CHAMBER D | METAL | B |
| LOW STRESS 10 kW TaN | METAL | B |
| WAFER TRANSPORT TO 1-2 FROM 7-2 | DIEL | C |
| 200C 1000W Lo OH OXIDE | DIEL | C |
| TRANSPORT FROM 1-2 TO 5-2 | DIEL | C |

EXAMPLE 2: SAMPLE TRACE OF A SCIENTIFIC WORKFLOW

FIG. 2

| ACTIVITY-BASED |
|---|
| PULL WAFERS |
| RECORD WAFER IDs / ATTACH WAFER ID MAP |
| INITIATOR COORDINATION |
| LAMP DEGAS IN CHAMBER E |
| SPUTTER ETCH IN CHAMBER D |
| LOW STRESS 10 kW TaN - Rs MONITOR |
| LAMP DEGAS IN CHAMBER E |
| SPUTTER ETCH IN CHAMBER D |
| LOW STRESS 10 kW TaN |
| WAFER TRANSPORT TO 1-2 FROM 7-2 |
| 200C 1000W Lo OH OXIDE |
| TRANSPORT FROM 1-2 TO 5-2 |

FIG. 4(a)

| SECTOR-BASED |
|---|
| CONTROL |
| INIT |
| METAL |
| DIEL |

FIG. 4(b)

| RESPONSIBLE-BASED |
|---|
| A |
| B |
| C |

FIG. 4(c)

TOPIC-BASED REPRESENTATION OF THE LOAN APPLICATION PROCESS IN EXAMPLE 1

TOPIC SUMMARIZATION PROCEDURE

RANDOM (BPIC)

TOPIC (BPIC)

RANDOM BANK

TOPIC BANK

CONFORMANCE FITNESS COMPARISON

| APPROACH | N=3 | | | N=4 | | | N=5 | | |
|---|---|---|---|---|---|---|---|---|---|
| | ARCS | PLACES | TRANS. | ARCS | PLACES | TRANS. | ARCS | PLACES | TRANS. |
| ORIGINAL ED | 3930 | 1505 | 1964 | 3419 | 1328 | 1709 | 3508 | 1356 | 1753 |
| TOPIC | 3855 | 1474 | 1927 | 3261 | 1269 | 1630 | 2685 | 1061 | 1342 |
| RANDOM | 3959 | 1500 | 1979 | 3733 | 1418 | 1866 | 3552 | 1351 | 1775 |
| SECTOR | 3697 | 1429 | 1848 | 3043 | 1195 | 1521 | 2775 | 1094 | 1387 |
| TOOL | 3722 | 1441 | 1860 | 2792 | 1110 | 1396 | 2758 | 1104 | 1379 |
| TRACKED BY | 3482 | 1357 | 1741 | 2827 | 1121 | 1413 | 2650 | 1051 | 1325 |

TRACES CLUSTERING RESULTS STRUCTURAL COMPLEXITY COMPARISON

ANALYZING MULTIDIMENSIONAL PROCESS TRACES UNDER EDIT-DISTANCE CONSTRAINT

BACKGROUND

This invention generally relates to analyzing multi-dimensional process traces.

Many application domains, such as scientific workflows and business processes, exhibit data models with complex relationships between objects. These relationships may be represented as sequences, in which each data item can be annotated with multi-dimensional attributes.

SUMMARY

Embodiments of the invention provide a method, system and computer program product for analyzing multidimensional data. In embodiments, the method comprises obtaining an original set of data having a sequential order and multiple original dimensions; selecting a topic-based summarization scheme to summarize the original set of data; and applying the selected topic-based summarization scheme to the original set of data to transform the original set of data into a new set of data having fewer dimensions than the original set of data, while preserving, within a defined measure, the sequential order of the original set of data.

In embodiments, the selecting a topic-based summarization scheme includes selecting a plurality of topics, each of the topic representing a set of the original dimensions.

In embodiments, the selecting a plurality of topics includes identifying a plurality of attributes, each of the attributes having a number of the original dimensions, and selecting the one of the attributes with the largest number of the original dimensions.

In embodiments, the applying the topic-based summarization scheme includes performing dimensionality reduction on the original set of data to transform the original dimensions to the topics.

As mentioned above, many application domains, such as scientific workflows and business processes, exhibit data models with complex relationships between objects. These relationships may be represented as sequences, in which each data item can be annotated with multi-dimensional attributes. In addition, there are increasing needs for applications to analyze this data to get operational insights. For example, in business processes, users are interested in clustering process traces into smaller subsets in order to discover process models that are less complex in each subset.

To enable such applications, it is important to be able to measure the similarity between data objects. However, measuring the similarity between sequence-based data is a known computationally expensive task.

Embodiments of the invention provide a framework to perform efficient analysis on sequence-based multi-dimensional data using intuitive and user-controlled summarizations. Embodiments of the invention us an error model for summary-based similarity under an edit-distance constraint, a similarity measure for sequences, and use summarization schemes that provide tunable trade-offs between the quality and efficiency of analysis tasks.

Embodiments of the invention provide a novel framework for analyzing multi-dimensional process traces using intuitive and user-controlled summarizations, and use an error model for summary-based similarity under an edit-distance constraint.

Embodiments of the invention use summarization schemes that offer flexible trade-off between the quality and efficiency of analysis tasks.

BRIEF DESCRIPTION OF THE SEVERAL VIEWS OF THE DRAWINGS

FIG. 2 shows a sample trace of a semiconductor manufacturing process.

FIGS. 4(a), 4(b) and 4(c) show different forms of summarization of the trace of FIG. 2.

DETAILED DESCRIPTION

Figure 1:
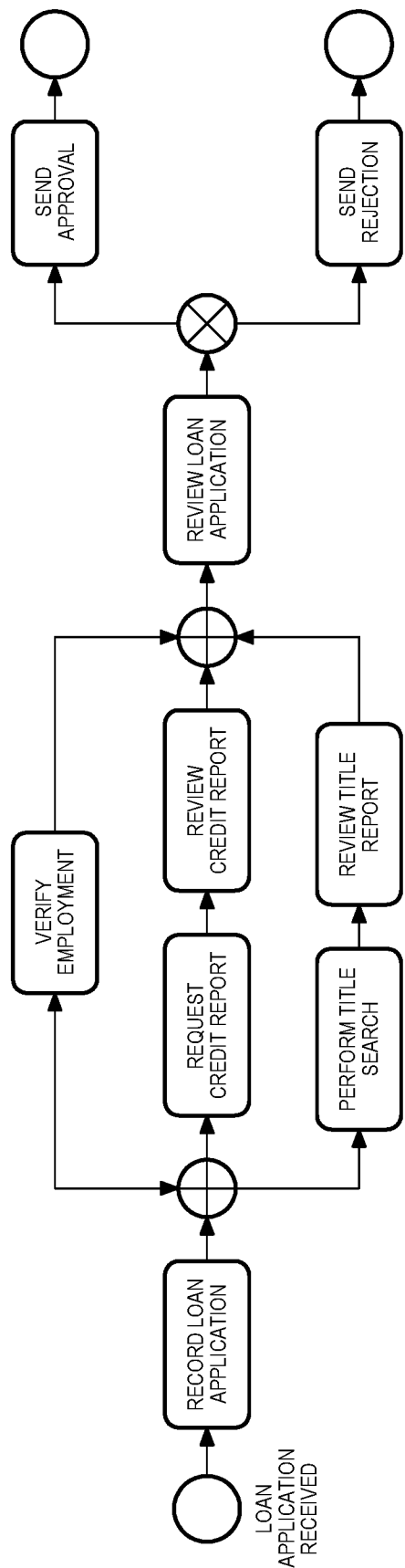
FIG. 1 illustrates a loan application process and a sample trace.

Many application domains, such as business processes and scientific workflows, exhibit data models in the form of multi-dimensional sequences of objects. For example, in business processes, given an underlying business process model represented as a directed acyclic graph of activities, the traces generated from the execution of the model are regarded as instances of the underlying model. Each trace comprises a sequence of activities sorted by time, where each activity in the trace appears in the process model and may be repeated in the trace. FIG. 1 shows an example of a loan application process model. The activities outlined in bold in the figure represent a possible execution trace of the model. In addition to the sequential structure, each activity also contains multi-dimensional attributes. For example, an activity in the loan application process can contain information about the person and the department that are responsible for the activity, the person who performs the activity, and the group to which he or she belongs.

In another example, provenance data captured from the execution of scientific workflows are also in the form of multi-dimensional sequences. FIG. 2 shows a sample trace of a semiconductor manufacturing process, where each activity can include additional information, such as the sector where the activity is performed and the person who is responsible for that activity.

With the popularity of such applications, there are increasing needs to analyze the data to get operational insights. For example, in business process management, as business models discovered from a complete process traces are often complex and difficult to comprehend, users are interested in clustering process traces into smaller subsets and applying process discovery algorithms on each subset. The models discovered using only the traces in a cluster tend to be both less complex and more accurate since there is less diversity among the traces within a cluster. In another example, scientists are interested in querying provenance data of scientific workflow executions to look for previous executions of a workflow that are similar to the one in the query.

Analyzing the multi-dimensional sequence data, however, poses a number of challenges. A first challenge is in terms of computational complexity of data analysis. For example, edit-distance is often used to capture the similarity between sequences. However, since edit-distance is quadratic to the sequence length and each sequence can comprise hundreds of data items (e.g., in business processes), it is computationally expensive to compute the similarities between sequences. This is especially challenging when dealing with large datasets and in applications such as traces clustering, where a lot of similarity computations need to be calculated. The computational complexity can also cause long application delay and thus affects interactive applications, such as similarity search, where users interact directly with the application and expect to get the results in a timely manner. A second challenge is to combine multi-dimensional attributes of data with the sequential structure between data objects into a unified approach. Edit-distance, for example, only concerns with counting the minimum number of basic operations required to transform one sequence of activities into the other, without considering the attributes of activities.

Figure 3:
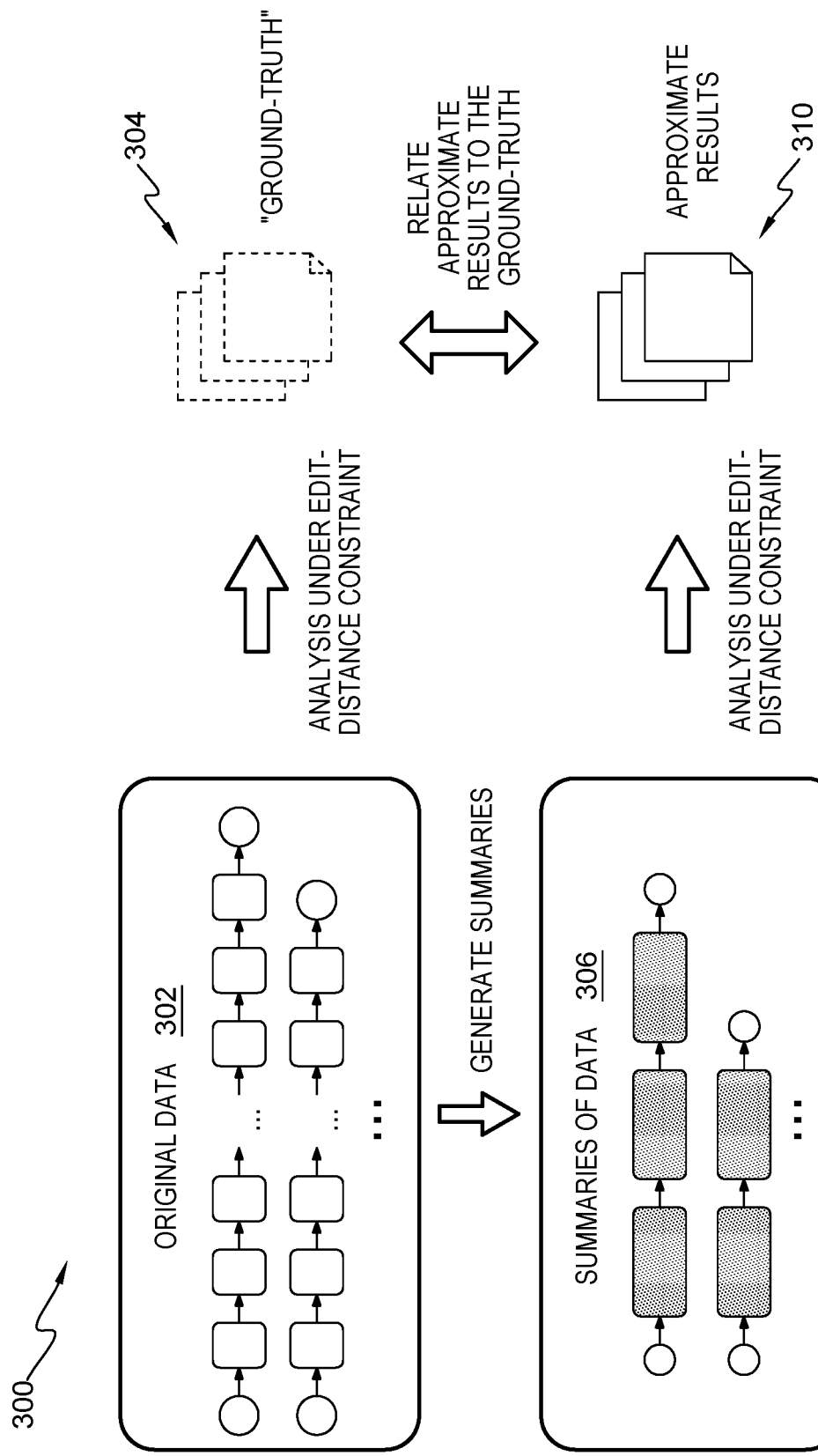
FIG. 3 shows an overview of an embodiment of the invention.

As illustrated in FIG. 3, embodiments of the invention provide a framework 300 for the efficient analysis of multi-dimensional sequence data 302 under edit-distance constraint. Embodiments of the invention, analyze tasks that are based on edit-distance similarity measure, a widely used measure for sequences. Instead of performing computationally expensive analysis on the original high-dimensional data 302, embodiments of the invention transform the data into a summary space that has fewer dimensions, so that more efficient analysis can be applied. To incorporate multi-dimensional attributes of data items into the analysis, embodiments of the invention use summarization schemes that allow users to select attributes as the summarization criteria. In addition to attribute-based summarizations, which produce summaries of good semantics but are limited in giving users control over the resolution of summaries (and thus, the efficiency), embodiments of the invention use topic-based summarization that enables the flexible trade-off between quality and efficiency of analysis tasks on summaries. In addition, embodiments of the invention use an error model for the edit-distance measure in the summary space to provide theoretical guarantees for the results of analysis tasks on summaries.

The framework 300 of this invention is used for the analysis of multi-dimensional sequence data under edit-distance constraint, and FIG. 3 shows a dataset 302 which may be analyzed in accordance with embodiments of the invention. Dataset 302 may be comprised of a set of process traces or logs of scientific workflow executions. Running an analysis, which would typically be computationally expensive due to the high-dimensionality of the data, provides results which are deemed as exact or "ground truth" answer 304.

Embodiments of the invention transform the original data into a new space 306 with a smaller number of dimensions, thus avoiding the computationally expensive analysis on the original high-dimensional data. The resulting output 310, which is inherently different than the "ground truth", is known as an approximate result. The summarization of the original data, and the analysis of the summarized data, present challenges.

One challenge is: how to generate summaries of data in a controlled and intuitive manner? Many sequence- and graph-based (in which sequence is a special form) summarization methods generate summaries using statistics, patterns, or sub-structures of the data. Thus, the resulted summaries are often difficult to interpret by users, as the resulted summaries lack the structural semantic connection with the original representation. The lack of structural semantics of summaries also prevents analysis tasks that rely on the structural information (such as edit distance-based analysis, whose results are easy-to-interpret by users) to be performed on summary space. Also, under currently existing methods, users do not have much control over how the summaries will be generated. As a result, it is difficult to integrate user expertise and feedback into the summarization process to guide the data analysis.

Another challenge is: How to relate the approximate results on the summaries to the results on the original data? Since the analysis results on data summaries might not be the same as those on original data, it is important to understand the relationship between the two results, and for all practical purposes, provide guarantees about the quality of results obtained from the summaries.

To address the above mentioned challenges, embodiments of the invention define sequential-order-preserving summarization on sequences and introduce several summarization schemes that give users more control over the resulted summaries. Furthermore, embodiments of the invention present an error model for summary-based similarity measure under edit-distance constraint. This error model provides quality guarantee over the results of similarity search task. Empirical studies on real traces show that the summary-based clustering of sequence data, in embodiments of the invention, produces results with comparable accuracy, compared with when using original data, while having better efficiency.

In embodiments of the invention, multidimensional sequence and summarization of sequence can be defined, in general, as follows.

First, a multidimensional set of objects is defined:

Definition 1. (Multidimensional Set) A multidimensional set O is defined as a set of objects O and a set of associated attributes $A=(A_1, A_2, \ldots, A_{|A|})$: $O=\langle O, A \rangle$, each object $o \in O$ is defined as a tuple: $o=(A_1, (O), A_2(o), \ldots, A_{|A|}(o))$, in which each i-th dimension corresponds to the value of attribute $A_i$ of o, denoted as $A_i(o)$.

Given the above definition of multidimensional set, multidimensional sequences is defined:

Definition 2. (Multidimensional Sequence) A sequence p of size m on a multidimensional set O is defined as an ordered set of m objects in O: $p=(p_1, p_2, \ldots, p_m)$, $p_i \in O$, $1 \leq i \leq m$.

$l_p(p)$ denotes the index, or position, of an object p in a sequence p. In the above definition, $l_p(p_i)=i$, $\forall 1 \leq i \leq m$. For example, FIG. 2 presents a sequence of objects defined on a multidimensional set with three attributes: Activity, Sector, and Responsible.

In embodiments of the invention, different forms of summarization of multidimensional sequences are used to improve efficiency of sequence analysis. Before formally defining summarization of sequences, the notion of many-to-one mapping of objects between multidimensional sets is defined:

Definition 3. (Many-to-one Mapping) A many-to-one mapping is defined as an object mapping function $f$ from an original multidimensional set O to a summary set S, $f: O \rightarrow S$, so that for each $p \in O$, $\exists! s \in S: s = f(p)$.

Next, the summarization of sequences is defined based on many-to-one mapping $f$, called $f$-summarization:

Definition 4. ($f$-Summarization) A $f$-summarization of a sequence p on O is defined as a summary sequence s on S, denoted as $s=f(p)$, where each object $p \in p$ is replaced by its many-to-one mapping $f: s = f(p)$, while retaining the same index $l_s(s) := l_p(p)$.

A summarization of a sequence is said to preserve the sequential relationship from the original sequence if it satisfies the following definition:

Definition 5. (Sequential Preserving Summarization) A $f$-summarization of a sequence p, denoted as $s = f(p)$, is a sequential preserving summarization of p if: $\forall p, p' \in p$, if $l_p(p) < l_p(p')$, then $l_s(s) \leq l_s(s')$, with $s = f(p)$, $s' = f(p')$.

$f$-summarization preserves the sequential relationship since it retains the indices of objects in the original sequence onto the summary sequence. The $f$-summarization defined in Definition 4, however, does not offer any size reduction of the original sequences, which is vital in improving the efficiency of sequence analysis. Therefore, reduced $f$-summarization, in which adjacent duplicate objects in the summary sequence are collapsed to reduce size of summarized sequence, is defined.

Definition 6 (Reduced $f$-Summarization) A reduced $f$-summarization of a sequence p on O is defined as a sequence s on S, denoted as $s = f^*(p)$, where each object $p \in p$ is replaced by its $f$-based mapping $s = f(p)$ in s and, $\forall p_i, p_{i+1} \in p$, $1 \leq i \leq |p|-1$, if $p_i = p_{i+1}$, then $l_s(p_i) = l_p(p_{i+1})$.

Proposition 1. (Sequential Preservation of Reduced $f$-Summarization) A reduced $f$-summarization is a sequential preserving summarization.

Proof. Given an original sequence $p=(p_1, p_2, \ldots, p_m)$ on O $p'=(p_{1'}, p_{2'}, \ldots, p_{n'})$ denotes a sequence on S and is the reduced $f$-summarization of p. Elements in p' can also be described as follows: $p_{1'} = p_1$ and $p_{i'} = f(\min_{l_p(\cdot)} \{p_j : p_j \in p, j \geq i, p_j \neq p_{i-1}\})$, for $1 < i \leq m$ (i.e., $p_{i'}$ is the first non-duplicate element since $p_{i-1}$).

Consider $p_i$ and $p_j \in p$, $1 \leq i < j \leq m$. There are three possibilities:

$p_i = p_j$ and $p_k = p_i (\forall k: i < k < j)$: In this case, $l_p(p_j) = l_p(p_i)$ and $l_{p'}(p_k) = l_{p'}(p_i)$, $\forall k: i < k < j$.

$p_i = p_j$ and $\exists! k: i < k < j$, $p_k \neq p_i$: In this case, $l_{p'}(p_i) < l_{p'}(p_k)$ and $l_{p'}(p_k) = l_{p'}(p_j)$.

As a result, $l_{p'}(p_i) < l_{p'}(p_j)$.

$p_i \neq p_j$: Since $1 \leq i < j \leq m$, $l_{p'}(p_i) < l_{p'}(p_j)$ according to the above definition of p'.

In all of the above cases, $l_{p'}(p_i) \leq l_{p'}(p_j)$, and thus, p' preserves the sequential relationship between elements in p.

Summarization

Summarization schemes on multi-dimensional sequences are discussed below.

Attribute-Based Summarization

To incorporate multidimensional attributes of a sequence's data items, an attributes compatible mapping that leverages data item's attributes as summarization criteria, is defined as follows:

Definition 7. (Attributes Compatible Mapping) Given multidimensional set $O = \langle O, A \rangle$ and a set of attributes $A \subseteq A$, a mapping $f$ is defined as A-compatible mapping if: $\forall p, q \in O$, $f(p) = f(q)$ if and only if $A_k(p) = A_k(q)$, $\forall A_k \in A$.

Next, an attribute-based summarization based on attributes compatible mapping, is defined as follows:

Definition 8. (Attribute-based Summarization) Given a multidimensional set $O = \langle O, A \rangle$ and a set of attributes $A \subset A$, an A-based summarization is defined as a reduced $f$-summarization, where the mapping $f$ is an A-compatible mapping on O.

Although attribute compatible summarization provides a way for users to choose attributes as summarization criteria and produces summaries that are easy to interpret, it does not however give users much control over the average length of summarized sequences, which is referred to as resolution. This is because attribute values are static and already defined with original data. FIGS. 4(a)-4(c) show examples of different attribute-based summarization of the trace in Example 2: Activity-based (FIG. 4(a)), Sector-based (FIG. 4(b)), and Responsible-based (FIG. 4(c)). The Activity-based summary has highest resolution among the examples, while the Responsible-based summary has lowest resolution (i.e., the most compact summary).

Since lengths of summarized sequences effectively influence the efficiency of sequence data analysis (i.e., the longer the lengths are, the more time-consuming data analysis will be), attribute-based summarization offers users with little flexibility in controlling the desired efficiency of the data analysis on summarized sequences. On the other hand, it is often desirable that users are able to make trade-off decisions between efficiency and accuracy of data analysis, especially when dealing with large data, or data of high complexity. For example, in sequence similarity search application, users might decide to tolerate a certain level of false positive in the results (e.g., 0.9 false positive rate) as a trade-off for faster response (e.g., results are returned within 5 seconds).

To address the above challenge, embodiments of the invention use a novel summarization scheme that offers more flexibility and better control over the resolution of summaries, while still capturing semantic and sequential relationships of original data as with attribute-based summarization.

Topic-Based Summarization

Figure 5:
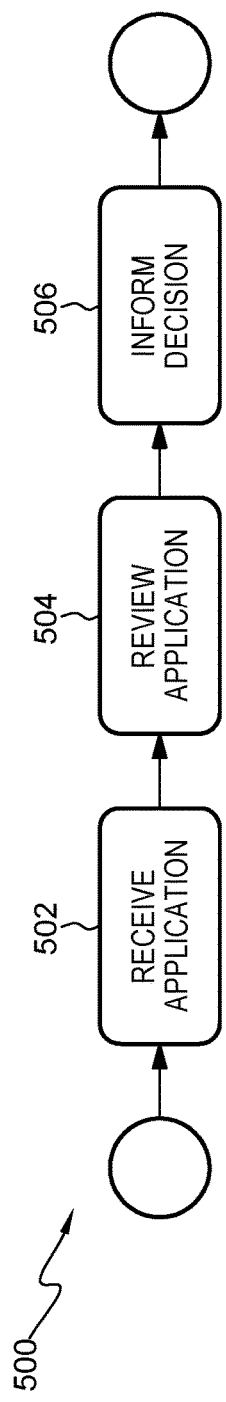
FIG. 5 is a topic-based representation of the loan application process in FIG. 1.

Business processes, such as one in FIG. 1, can often be represented by higher-level process models of fewer dimensions. FIG. 5 shows an example of a more general process model 500 of the process mode in FIG. 1. Process model 500 includes the activities of receive the application 502, review the application 504, and inform the applicant of the decision 506. Each activity in FIG. 5 corresponds to multiple activities in FIG. 1. Embodiments of the invention use a topic-based summarization technique that captures the many-to-one mapping from original sequences to topic-based summarization of fewer dimensions, where each topic is a representation of a set of original dimensions. Since the topics are implicit from the original representation of sequences, dimensionality reduction on original sequences is first performed to transform original dimensions to topics, then, topic-based summarization is defined using the new representation.

Dimensionality Reduction on Sequences

Before applying dimension reduction techniques to original sequences, it is important to have an appropriate data representation for sequences.

In embodiments of the invention, an attribute of the original sequences is selected, and multidimensional sequences are transformed to the appropriate attribute-based summarization. In embodiments of the invention, the attribute with the highest number of dimensions is selected, as such the attribute often captures the most essential information about the objects in the original multidimensional set. For example, in Example 2, Activity is the attribute with the highest number of dimensions and it is also the base attribute to represent sequences, while other attributes, such as Sector and Responsible, provide supporting information for Activity.

In embodiments of the invention, each sequence p is represented as a numeric vector $(\vartheta_1, \vartheta_2, \ldots, \vartheta_{|A^*|})$, where $A^*$ is the base attribute that sequences are transformed to in the first step and $|A^*|$ is the number of dimensions on $A^*$. $\vartheta_i$ is measured for p in a way that captures both the local importance of each dimension and its specificity to a sequence. To capture the local importance, embodiments of the invention use the frequency of the i-th dimension in p, denoted as $tf_p^i$, that is defined by the number of items in p whose values equal the i-th dimension of $A^*$, denoted as $a_i$. To capture the specificity, embodiments of the invention use the popularity of a dimension across all sequences: $df_i=|\{p\in S|a_i\in p\}|$, where S is the set of all sequences. Intuitively, the higher $df_i$ is, the more popular the i-th dimension is and, thus, the less specificity it is to a sequence. The formulation of $\vartheta_i$ is as follows:

$$\vartheta_i = \begin{cases} (1 + \log(tf_p^i)) \times \log\left(\frac{|S|}{df_i}\right) & if a_i \in p \\ 0 & otherwise \end{cases} \quad (1)$$

After representing sequences as vectors, the set of sequences S can be represented as a matrix M, whose size is $|S|\times|A^*|$ with each row corresponding to a vector representation of a sequence in S. With this matrix representation, standard dimension reduction techniques can be applied on M, such as non-negative matrix factorization (NMF), principle component analysis (PCA), or singular value decomposition (SVD), among others. The results of these techniques can be presented as two matrices M' and W. M, whose size equals $|S|\times k$ with k being the number of new dimensions (i.e., k=|S|), represents the original sequences on the summary space. W, whose size equals $|O|\times k$, represents the original dimensions on the new dimensions, or topics (i.e., each row is a vector representing the distribution of an original dimension over the set of new dimensions).

Topic-Based Summarization From Dimensionality Reduction Results

In embodiments of the invention, based on the results of dimensionality reduction, a many-to-one mapping is produced from the original dimensions to topics. Two dimensions $a_i$, $a_j$ in the original space are likely to be in the same topic if their corresponding vectors in W have high similarity (e.g., using Cosine similarity). In addition, $a_i$ and $a_j$ likely to be in the same topic if they frequently appear next to each other in a sequence (i.e., they represent two closely related activities in the underlining process model). From these insights, the problem of a finding an optimal many-to-one mapping from original dimensions to topics is modeled as a constrained optimization problem:

$$\operatorname*{argmax}_{f} \lambda \cdot \sum_{f(a_i)=f(a_j)} \theta(a_i, a_j) + (1-\lambda) \cdot \sum_{(a_i,a_j)} \omega(a_i, a_j)\theta(a_i, a_j) \quad (2)$$

$$subject to\ f: O \to S$$

$$\forall\ a_i, a_j \in O,\ iff(a_i) \neq f(a_j),\ then a_i \neq a_j.$$

$$|S| = k.$$

where $\theta(a_i, a_j)$ represents the similarity between dimensions $a_i$ and $a_j$ based on the their corresponding representation in W, and $\omega(a_i, a_j)$ represents the number of times $a_i$ and $a_j$ appear next to each other in input sequence set S. In embodiments of the invention, topic summarization can be defined as follows:

Definition 9. (k-Topic Summarization) A k-topic summarization of sequences from original multidimensional set O to a summary set S is defined as a reduced $f$-summarization, where the mapping $f$ is the solution of the optimization problem defined in (2).

Proposition 2 (NP-hardness of k-Topic Summarization) The problem of finding a k-topic summarization of sequences on O is NP-hard.

Proof. The optimization problem in Equation 2 is a variant of the set partitioning problem, and finding a feasible solution for such a problem is NP-hard.

Therefore, embodiments of the invention use a "greedy" heuristic approach. In embodiments of the invention, a greedy approximation approach is similar to that of agglomerative clustering algorithm. Specifically, the greedy approximation approach starts with treating each original dimension as a singleton cluster and then successively merges pairs of dimensions that are closest to each other until all clusters have been merged into a single cluster that contains all dimensions. This step creates a hierarchy where each leaf node is a dimension and the root is the single cluster of the last merge. Because in embodiments, a partition of disjoint k clusters is used as the new dimensions, the next step is to cut the hierarchy at some point to obtain the desirable number of clusters. To find the cut, an approach is used that is based on finding a minimum similarity threshold so that the distance between any two dimensions in the same cluster is no more than that threshold, and no more than k clusters are formed.

Figure 6:
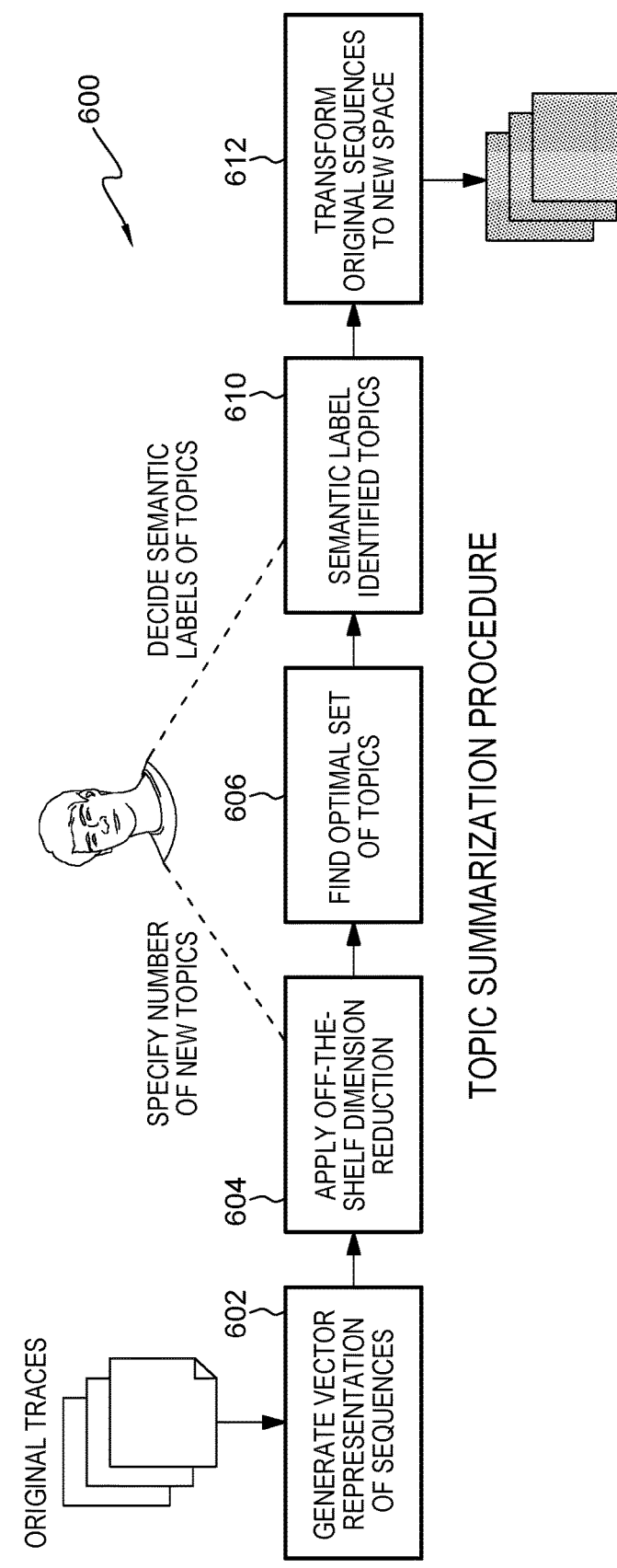
FIG. 6 illustrates a topic summarization procedure in accordance with an embodiment of the invention.

The procedure of generating k-topic summarization of sequences is summed up in FIG. 6. This procedure comprises, as discussed above, generating a vector representation of sequences 602, applying dimension reduction 604, finding the optimal set of topics 606, applying semantic labels to identified topics 610, and transforming the original sequences to the new space 612. In this procedure, there are two steps that require inputs from the user: the number of topics (i.e., dimensions) on the summary space, and semantic labels for discovered topics. These inputs can be used by users to control the resolution of the summary space, as well as to integrate user expertise into the summarization (and thus, to the analysis tasks).

Error Model for Edit-Distance on Summaries

Embodiments of the invention focus on the relationship between similarity of sequences on summary space with that on original space under edit-distance constraint: ed(p,q) & ed($f(p)$, $f(q)$) (where ed is the edit-distance function and $f$ is a summarization function). Edit-distance is selected as the similarity measure because it can capture both the structural similarity (i.e., whether two sequences comprise data items in similar orders) and content-based similarity (i.e., whether two sequences share a similar set of data items) between sequences. In addition, edit-distance's result can be easily interpreted by users (i.e., the results can be presented as a chain of edit operators to transform a sequence to the other).

Edit-Distance

Edit-distance measure between two sequences can be formally defined as follows:

Definition 10 (Edit-distance) Edit-distance between two sequences p,q, denoted as ed(p,q) is defined as the minimum number of edit operations (i.e., replace, delete, insert) that need to be taken to transform p to q.

In terms of the relationship between ed(p,q) and ed($f(p)$, $f(q)$), important properties include: contractive property and proximity preservation property.

Definition 11. (Contractive Property) Given a summarization $f$, the edit-distance measure satisfies the contractive property on $f$ if ed(p,q)≥ed($f(p)$, $f(q)$), $\forall$p q.

Contractive property is particularly important for applications such as similarity search, because it guarantees that performing edit-distance based similarity search on the summary space using $f$ will yield results with 100% recall. Specifically, given a query sequence p and an edit-distance threshold $\chi$, the similarity search task needs to find all sequences in the sequence set S that have edit-distances with p smaller or equal than $\chi$: S*={q∈S|ed(p,q)≤$\chi$}. If the contractive property holds for a summarization $f$, expensive calculation of edit-distance on original space can be avoided by finding all sequences q that satisfy the threshold $\chi$ on summary space: $\overline{S}$={q∈S|ed($f(p)$, $f(q)$)≤$\chi$}. Because if ed(p,q)≤$\chi$, the ed($f(p)$, $f(q)$)≤$\chi$; guarantees that if q∈S*, then q∈$\overline{S}$ (i.e., 100% recall).

Definition 12. (Proximity Preservation Property) Given a summarization $f$, edit-distance measure satisfies the proximity preservation property on $f$ if ed(p,q)≥ed(p,r), then ed($f(p)$, $f(q)$)≥ed($f(p)$, $f(r)$), $\forall$p,q, r.

Proximity preservation property is particularly important for applications such as traces clustering that groups similar traces into the same cluster. This is because the proximity preservation property guarantees that traces that are similar in original space are also similar in summary space. Thus, the clustering results on the summary space will likely be similar to those on the original space.

Error Model for Edit-Distance on Summary Space

To answer the questions regarding the relationship between ed(p,q) and ed($f(p)$, $f(q)$), embodiments of the invention use an error model for edit-distance measure on summary space.

In this model, the contractive property does not hold in general for edit-distance between summarized sequences:

Theorem 1 Contractive property does not hold in general for summarized sequences.

Proof. The above theorem is proven by providing a counter example.

Also, under certain circumstances, the contractive property holds for edit-distance between summarized sequences. One such circumstance is when the summarization $f$ is a non-reduced many-to-one summarization:

Theorem 2 If $f$ is a non-reduced many-to-one summarization on O, as defined in Definition 4, then: ed(p,q)≥ed($f(p)$, $f(q)$), $\forall$p,q on O.

Proof. Assume that p=($p_1$, $p_2$, ..., $p_m$), q=($q_1$, $q_2$, ..., $q_n$). For compact representation, ed(p,q) is denoted as ed and ed($f(p)$, $f(q)$) is denoted as ed'.

As part of the recursive Wagner-Fischer algorithm to calculate edit-distance between two sequences p and q, consider the step that involves comparing two data items $p_i$∈p and $q_j$∈q (1≤i≤m, 1≤j≤n). If the edit-distance at the current step is denoted as $ed_{ij}$ and $ed'_{ij}$ (for edit-distance on summary space), based on the recursive formula of the Wagner-Fischer algorithm:

If $p_i$=$q_j$, then $ed_{ij}$=$ed_{i-1, j-1}$. Because of the many-to-one summarization $f$, $f(p_i)$=$f(q_j)$. Hence, $ed'_{ij}$=$ed'_{i-1, j-1}$. So, both $ed_{ij}$ and $ed'_{ij}$ do not require any edit cost in this case.

If $p_i$≠$q_j$, then $ed_{ij}$=min($ed_{i-1, j}$+1, $ed_{i, j-1}$+1, $ed_{i-1, j-1}$+1). Because of the many-to-one summarization $f$, either $f(p_i)$=$f(q_j)$ or $f(p_i)$≠$f(q_j)$. Thus $ed'_{ij}$=min($ed'_{i-1, j}$+1, $ed'_{i, j-1}$+1, $ed'_{i-1, j-1}$+1) if $f(p_i)$≠$f(q_j)$ (i.e., one edit cost), or $ed'_{ij}$=$ed'_{i-1, j-1}$ if $f(p_i)$=$f(q_j)$ (i.e., no edit cost). So, in this case, $ed_{ij}$ requires one edit cost, while $ed'_{ij}$ requires either one or zero edit cost.

Therefore, $eq_{ij}$≥$eq'_{ij}$, $\forall$i, j. Since the values {$eq_{ij}$} and {$eq'_{ij}$} form the matrix used by recursive algorithm to calculate ed(p,q) and ed($f(p)$, $f(q)$) respectively, then ed(p,q)≥ed($f(p)$, $f(q)$).

Consider the case when $f$ is a reduced many-to-one summarization. In this case, even though it cannot be proven that the contractive property holds for any sequence pairs using summarization $f$, less strict rules can be derived to indicate whether the contractive property holds or does not hold for edit-distance of a particular pair of sequences p,q using summarization $f$:

Theorem 3 Given two sequences p,q on original space O, if $f$ is a reduced many-to-one summarization on O, as defined in Definition 6, then:

If $\Gamma_{p,q}$≥$\Lambda_{f(p), f(q)}$, then ed(p,q)≥ed($f(p)$, $f(q)$); or edit-distance on summary space by $f$ satisfies the contractive property.

If $\Gamma_{f(p), f(q)}$>$\Lambda_{p,q}$, then ed(p,q)<ed($f(p)$, $f(q)$); or edit-distance on summary space by $f$ does not satisfy the contractive property.

where $\Lambda_{p,q}$=max(|p|, |q|) and $\Gamma_{p,q}$=|||p|−|q|||, with |p| being the length of p.

Proof. This theorem can be proven by noticing that $\Lambda$ and $\Gamma$ in fact define the upper bound and lower bound on the edit-distance of a pair of sequences.

The first rule is proven by using the chain rule of inequality: ed(p,q)≥$\Gamma_{p,q}$≥$\Lambda_{f(p), f(q)}$≥ed($f(p)$, $f(q)$).

Similarly, for the second rule: ed($f(p)$, $f(q)$)≥$\Gamma_{f(p), f(q)}$>$\Lambda_{p,q}$≥ed(p,q).

Although Theorem 3 does not cover all cases, empirically it is shown that the number of sequence pairs whose edit-distances on reduced summarization violate the contractive property is very small. Thus, it has a high recall for similarity search task when using reduced many-to-one summarization.

For the proximity preservation property, even though a theoretical guarantee cannot be obtained, it can be shown that the edit distance-based traces clustering results on summary space have comparable accuracy, compared with those on original space, while having better efficiency. This implies that the proximity relationship is well-preserved on summary space under edit-distance constraint.

Evaluation

The utility of the framework of embodiments of the invention can be demonstrated through an experimental evaluation of the effectiveness and efficiency of different disclosed schemes.

Evaluation Settings

Analysis tasks: The effectiveness and efficiency of the summarization schemes are evaluated on two analysis tasks: trace similarity search and traces clustering.

Datasets: Two datasets from different domains are used: a set of BPIC 2015 dataset (1199 traces with 289 activity types) that contains process traces of building permit applications, and a BANK dataset (2000 traces with 113 activity types) that comprises synthetically generated logs that represent a large bank transaction process.

Summarization schemes: Results of analysis tasks on summary space are compared using the above-discussed summarization schemes (i.e. Topic and Attribute) Random summarization, which randomly maps an original dimension to a new dimension in the summary space, and with the analysis results on the original space.

Evaluation metrics: For the similarity search task, since the contractive property holds for most of the cases, the recall rate is high. Thus, this example is only concerned with the false positive rate of the similarity search results. Given an edit distance threshold $\chi$, this metric indicates that, out of all sequence pairs that satisfy $ed(f(p), f(q)) \leq \chi$ on the summary space, how many of them actually satisfy the threshold in the original space: $ed(p,q) \leq \chi$.

For the traces clustering task, the clustering results are evaluated using process-specific metrics: weighted average conformance fitness, and weighted average structure complexity. While the process model's conformance fitness quantifies the extent to which the discovered model can accurately reproduce the recorded traces, the structure complexity quantifies whether the clustering results produce process models that are simple and compact. Given a summarization scheme, all sequences are transformed to the summary space, and then traces clustering is performed (using hierarchical clustering) with edit-distance as the similarity measure. Then, a process model is generated for each cluster using a heuristic mining algorithm and then converted to the Petri-Net model for conformance analysis. Given the Petri-net model, two available procedures from the ProM framework are used for fitness and structural complexity analysis: The Conformance Checker procedure is used to measure the fitness of the generated process models, and the Petri-Net Complexity Analysis procedure is used to analyze the structural complexity of the process models. After fitness and complexity scores are calculated for each cluster, the final scores are calculated as the average score over all clusters, weighted by clusters' sizes.

The evaluation was run on a computer with 16 GB of RAM and a 2.7 GHz quad-core Intel Core i7 CPU.

Effectiveness of Summarization Schemes on Similarity Search

To evaluate the effectiveness of different summarization schemes on similarity search task, the number of dimensions on summary space used by Random and Topic was varied; and vary the attribute used by Attribute was varied and the false positive results over different edit-distance thresholds were compared.

Figure 7A:
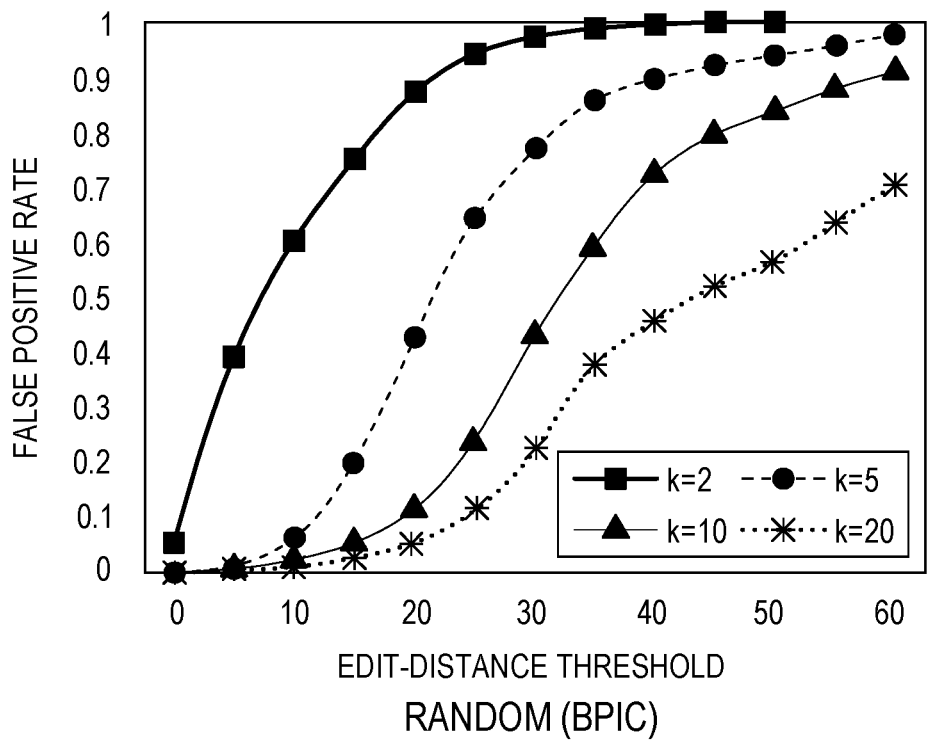
FIGS. 7(a) and 7(b) show false positive rates by different summarization schemes on similarity search task using a BPIC dataset.
Figure 7B:
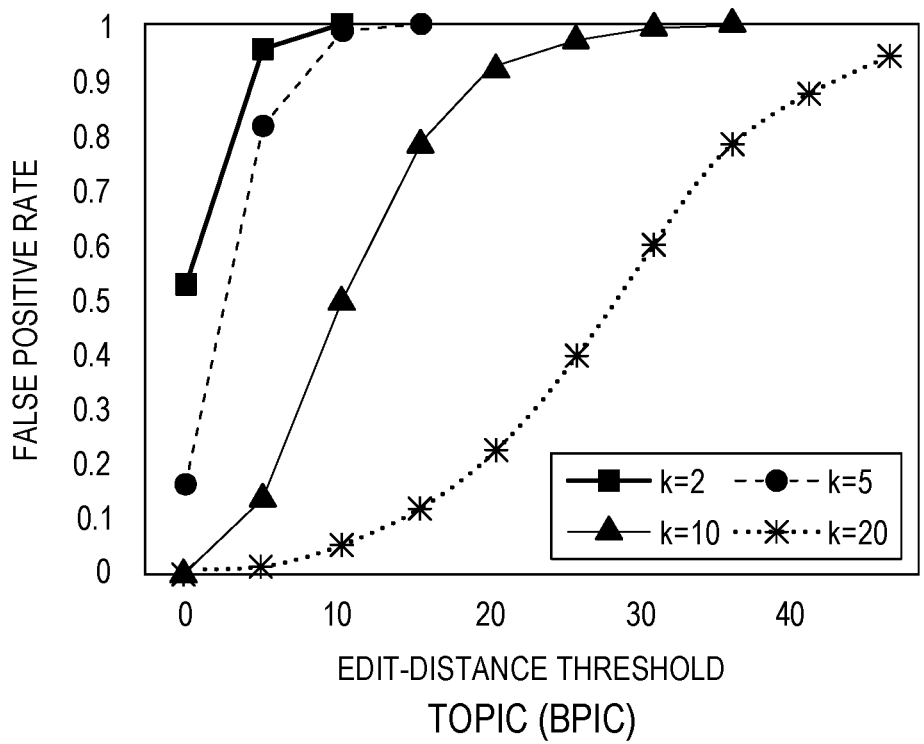
Figure 8A:
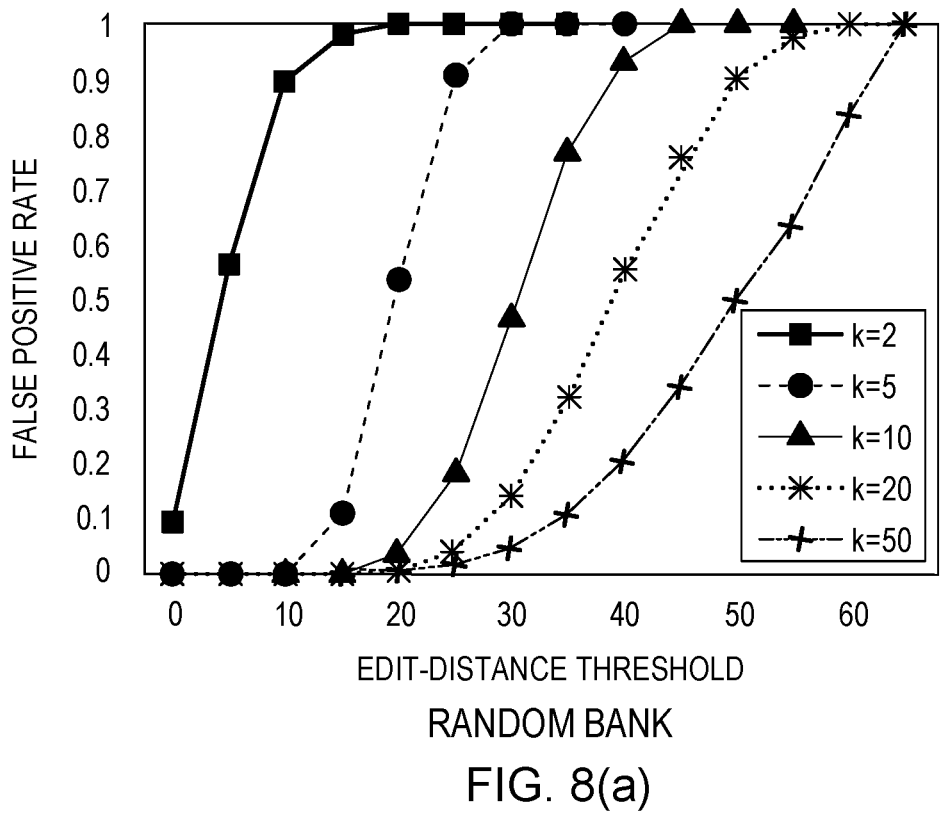
FIGS. 8(a) and 8(b) show false positive rates by different summarization schemes on similarity search task using a BANK dataset.
Figure 8B:
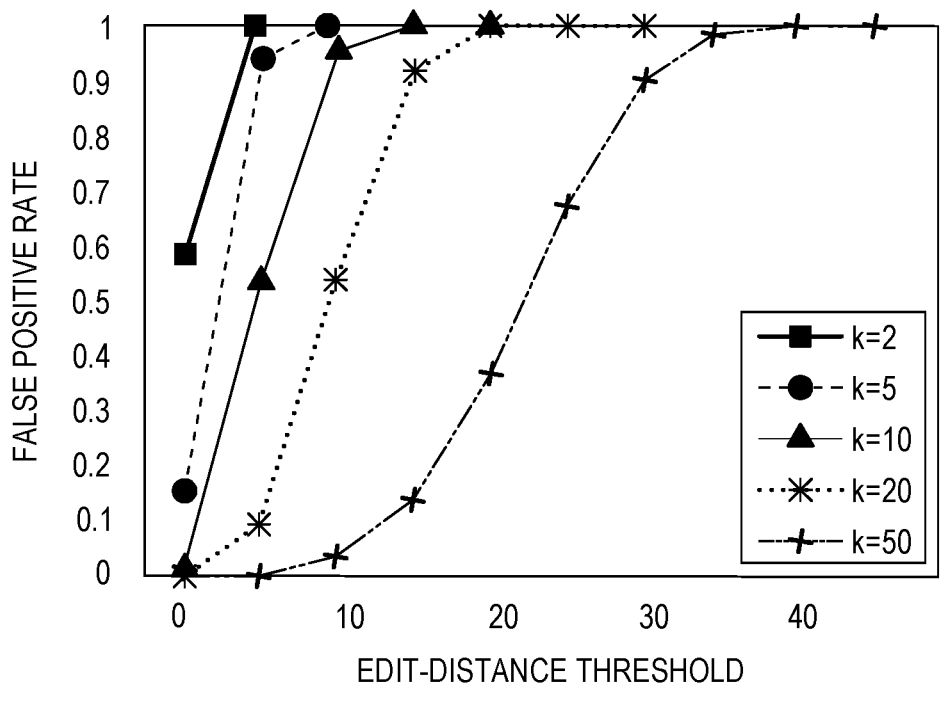

FIGS. 7(a) and 7(b) show the results on the BPIC dataset, and FIGS. 8(a) and 8(b) show the results for the BANK dataset. As expected, the higher the number of dimensions in the summary space (denoted by k) is, the better the result is (i.e., lower false positive rates). That is because, with a higher number of dimensions on the summary space, summaries of sequences more resemble the original sequences. Thus, there is little difference between edit-distances on the summary space and on the original space (hence, lower false positive rate). When comparing the results of different summarization schemes on the same number of dimensions, Random outperforms Topic summarization (at the cost of interpretability of summaries and the efficiency, as discussed below). For Attribute (FIG. 8c), since there is no control over the number of dimensions (since it depends on the attribute data), the quality of the results also depend on the chosen attribute. Specifically, TrackedBy attribute outperforms Sector and Tool. This is in part because there are more dimensions on TrackedBy's summary space, and thus the summaries on TrackedBy space more resemble the original sequences. Sector and Tool produce similar results, since similar Tools are often used in the same Sector.

Effectiveness of Summarization Schemes on Traces Clustering

Figures 9, 10:
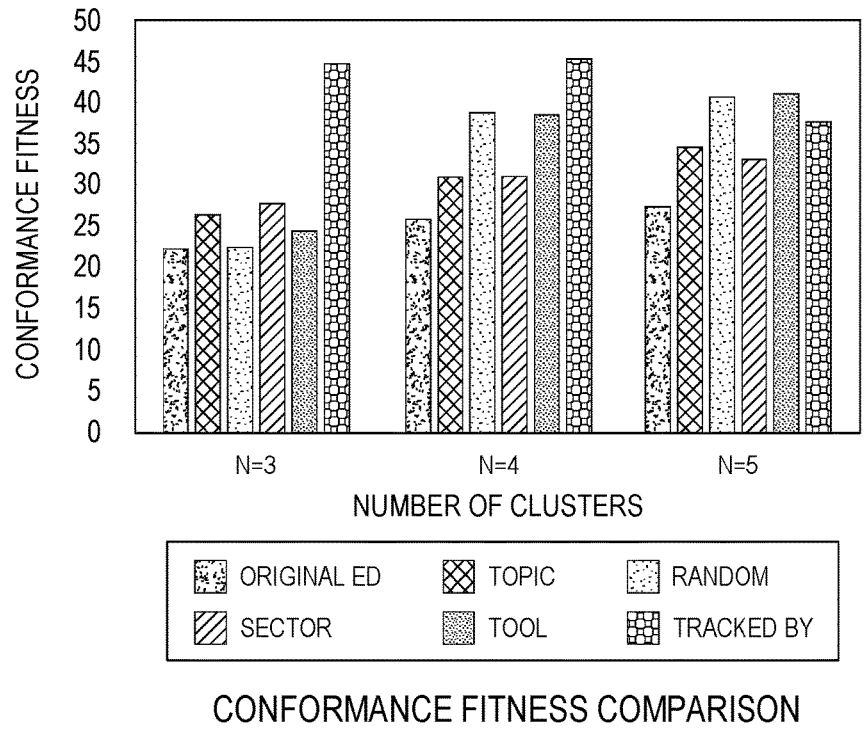
FIG. 9 shows the conformance fitness of clustering results on summary space by different summarization schemes.
FIG. 10 is a table that shows a traces clustering results structural complexity comparison.

For the traces clustering task, FIG. 9 shows that, surprisingly, using summarization schemes not only helps improve the efficiency of the clustering task (as discussed later), but also helps produce clusters with process models of higher fitness, compared with the clustering results on original space. The trend is similar when varying the number of clusters N. That is because measuring trace similarity on the summary space helps prevents noises that often exist when measuring similarity using the original representation.

Among summarization schemes, Attribute helps produce clustering results of highest conformance fitness (especially when using TrackedBy attribute). That is because Attribute summarizations capture better the semantic relationship between traces (e.g., traces are similar if the corresponding sequences of Sector, Tool, or TrackedBy are similar).

In terms of the structural complexity (FIG. 11), the Attribute summarizations again outperform other summarization schemes and the result on original space. This is again due to the Attribute's ability to capture semantic relationship between traces, and thus, it helps produce clusters whose process models capture actual groups of traces that share similar semantic (and thus, have simple model structure). On the other hand, Random is the worst performer, due to the fact that random summarization could not capture the semantic relationship between traces.

In both conformance fitness and structural complexity tests, the Topic summarization produces acceptable results. It again shows that Topic in embodiments of the invention, is the choice of approach when it comes to flexible trade-off between the effectiveness and efficiency of the analysis task (i.e., similar to similarity search task, k can be tuned to achieve better efficiency for clustering task).

Efficiency of Summarization Schemes on Similarity Calculation

To evaluate efficiency of different summarization schemes, we vary the number of dimensions k on the summary space is varied and the time it takes to calculate the edit-distance similarity between all pairs of sequences is measured.

Figure 11A:
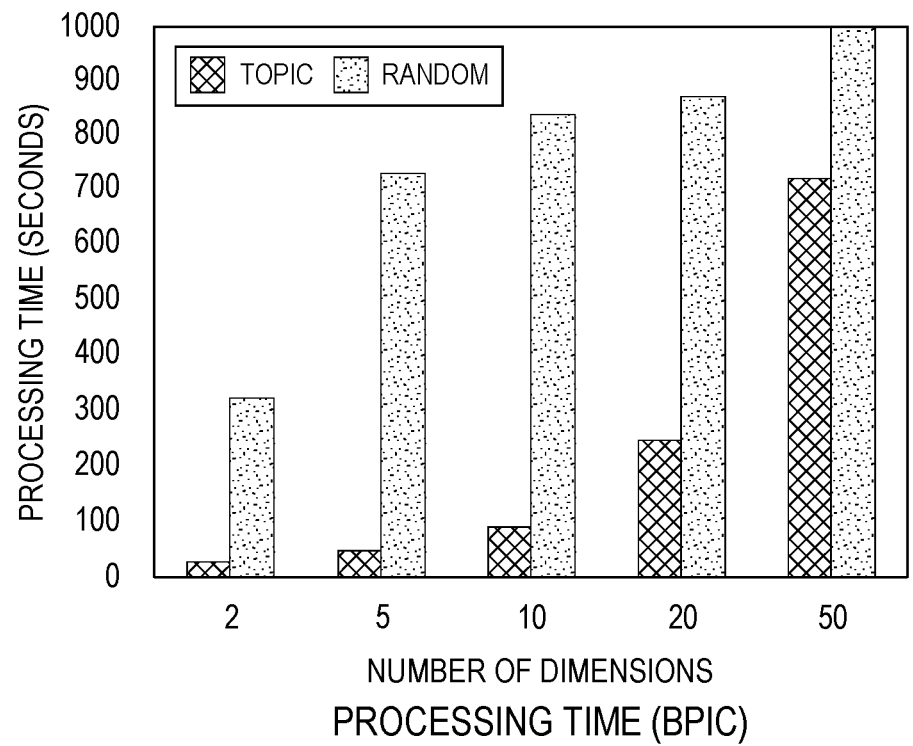
FIGS. 11(a) and 11(b) illustrate efficiency comparison between Random and Topic summarizations using the same number of dimensions on the BPIC and BANK datasets.
Figure 11B:
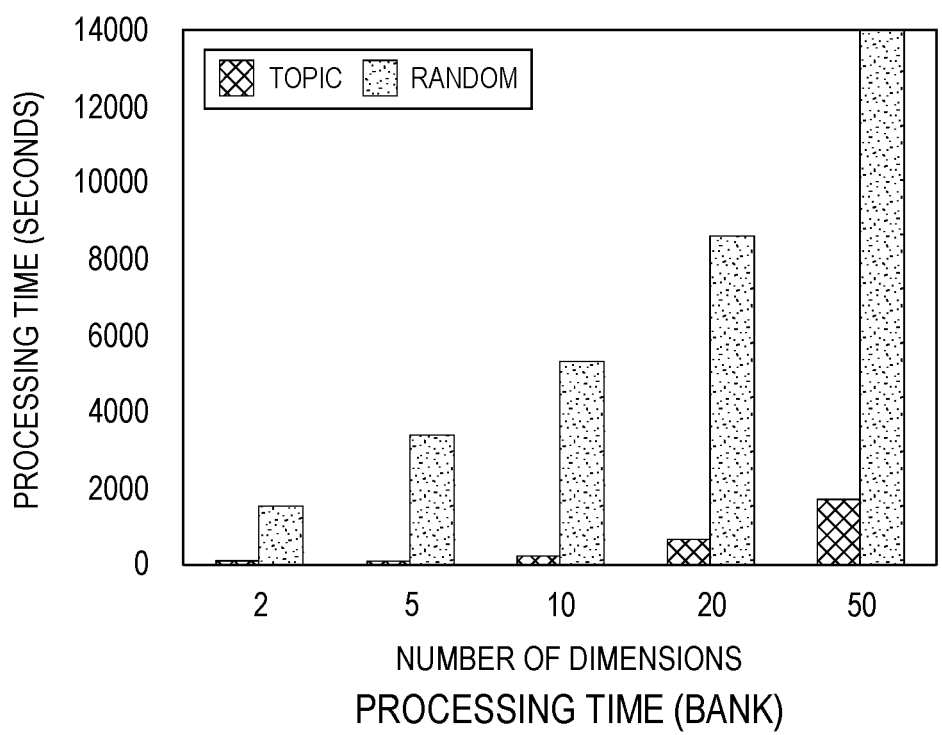

As expected, for both datasets and both Random and Topic summarizations1, the higher k is, the longer the time it takes to calculate the edit-distances (FIG. 11). That is because, the higher k is, the longer the sequences are in summary space, and thus, it is more expensive to calculate the edit-distances. At the same value of k, Topic outperforms Random, which verifies Topic's ability to capture the semantic relationship between original dimensions, and thus significantly reduces the size of sequences on summary space, as well as the processing time. Also, even at different values of k where similar effectiveness of results by Random and Topic are observed (e.g., k=2 with Random and k=10 with Topic on Lithography dataset—See FIGS. 7(a), 7(b), 8(a) and 8(b)), Topic is still much more efficient than Random.

Embodiments of the invention provide a framework to perform efficient analysis on sequence-based multi-dimensional data using user-controlled summarizations. Embodiments of the invention use a set of summarization schemes that offer flexible trade-off between quality and efficiency of analysis tasks and an error model for summary-based similarity under an edit-distance constraint. The evaluation results on real-world datasets verify the effectiveness and efficiency of the framework of embodiments of the invention.

Embodiments of the invention may be used, for instance, for searching, clustering, and generating summaries. For example, given a trace, embodiments of the invention may be used to search for traces (which exist in some data store) for traces that are similar to the given trace. Also, given a set of traces, embodiments of the invention may be used to cluster similar traces together to detect anomalies or for further analysis. As another example, embodiments of the invention may be used to generate representative summaries of traces for purposes of illustrations.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 12:
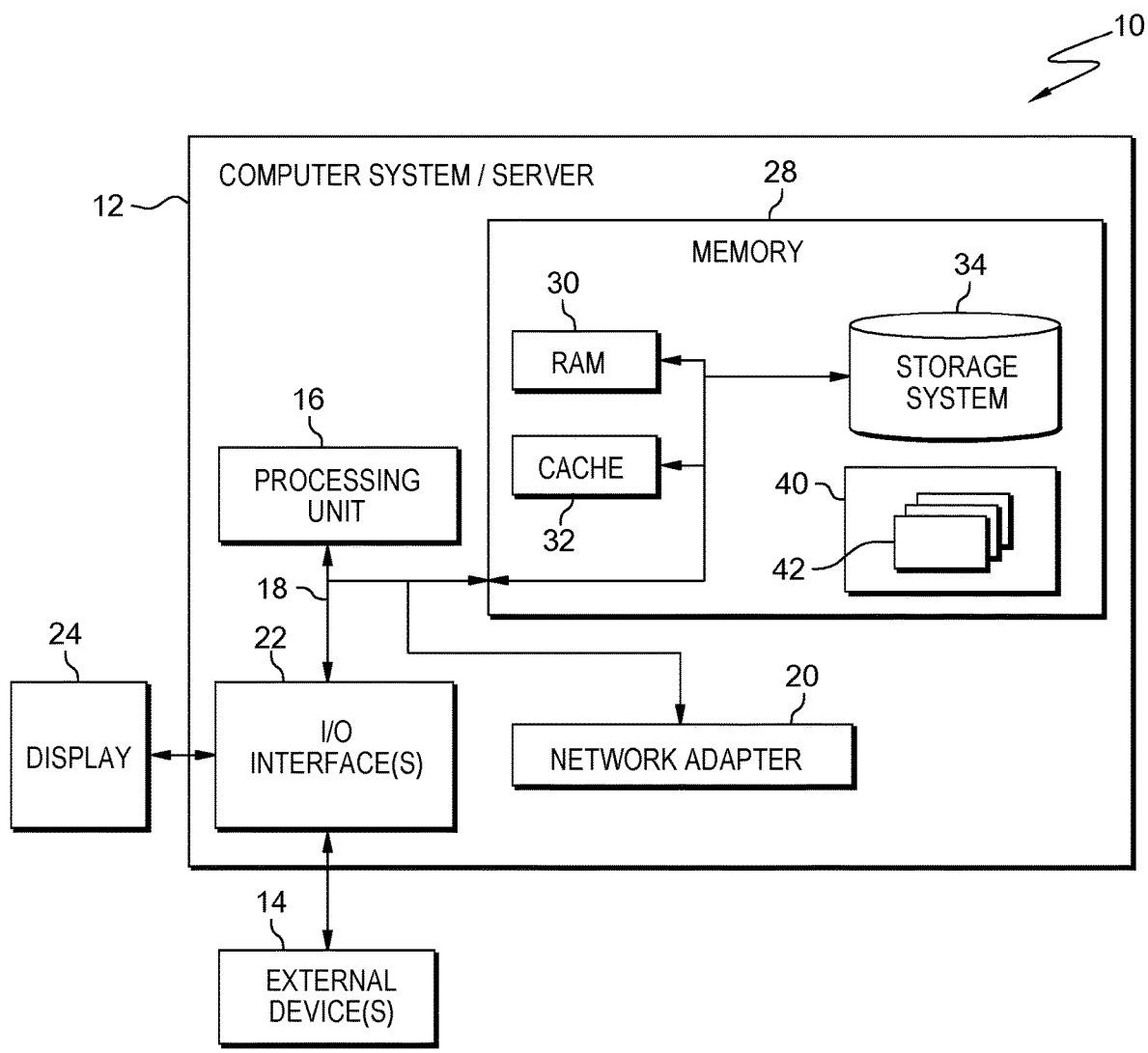
FIG. 12 depicts a cloud computing node that may be used in an embodiment of the present invention.

A cloud computing environment is service oriented with a focus on statelessness, low coupling, modularity, and semantic interoperability. At the heart of cloud computing is an infrastructure comprising a network of interconnected nodes. Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
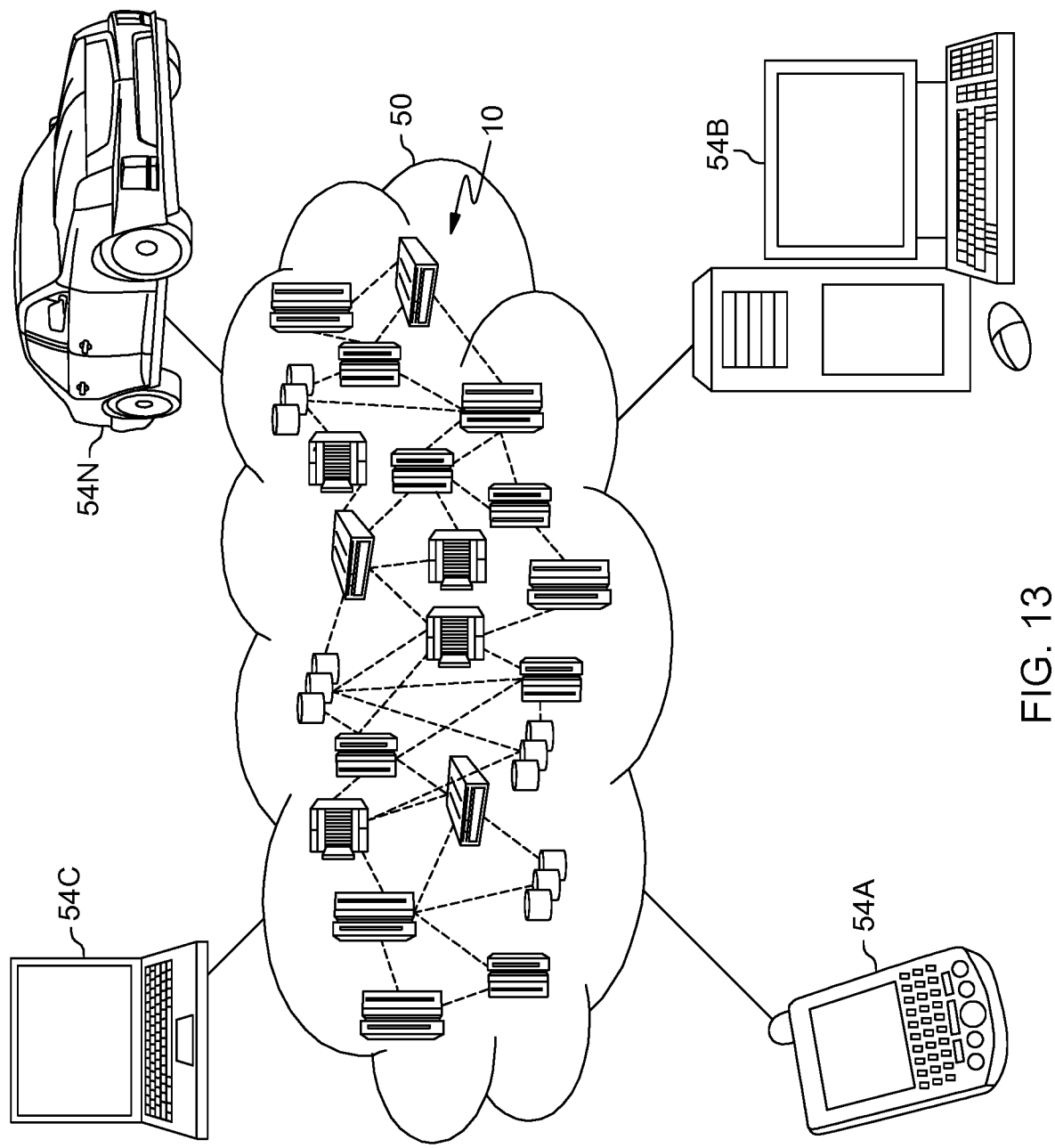
FIG. 13 depicts a cloud computing environment that may be used in an embodiment of the present invention.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 14:
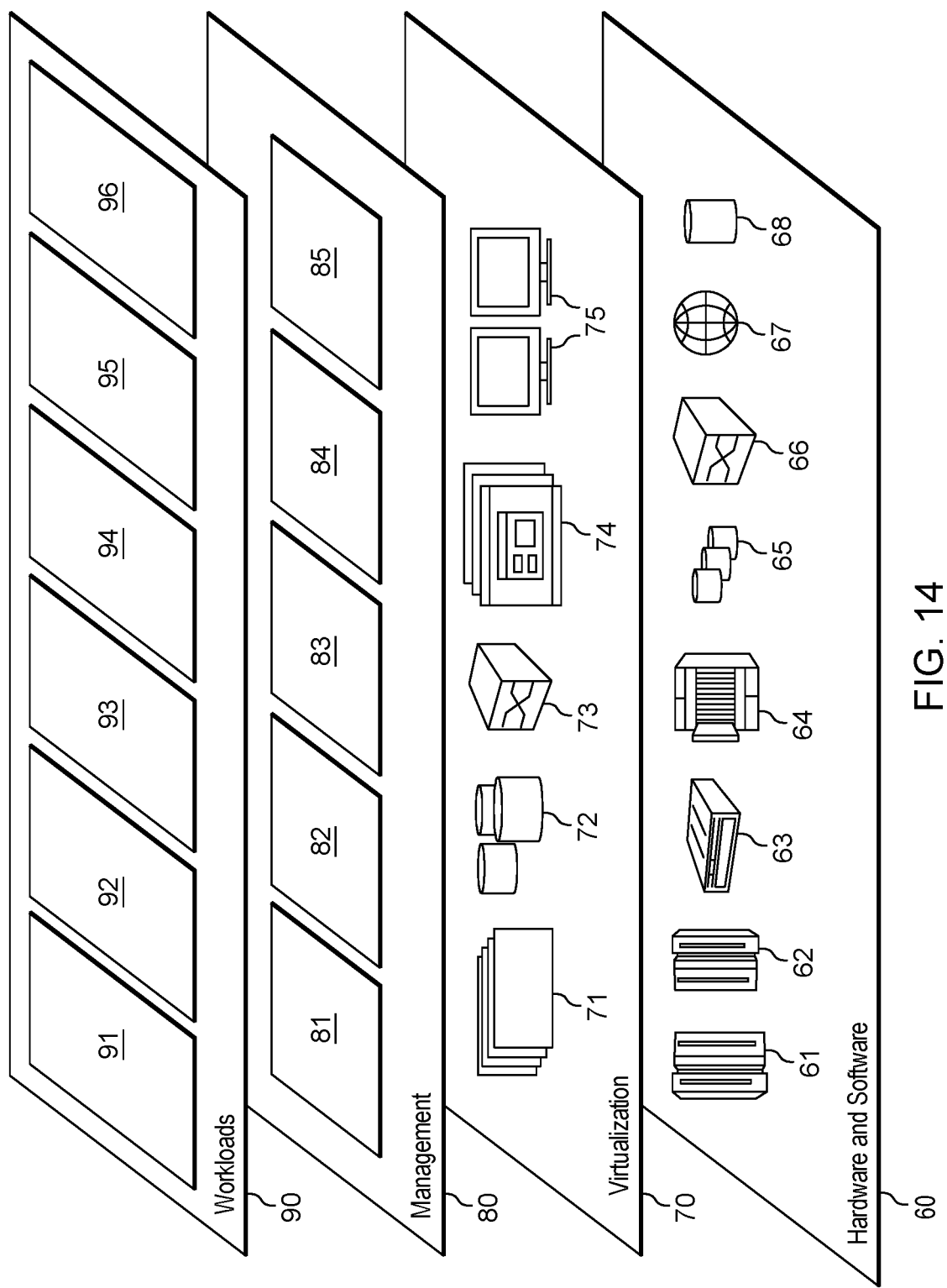
FIG. 14 depicts abstraction model layers that may be used in an embodiment of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto.

As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interest highlight and analyzing multidimensional process traces 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A computer-implemented method of analyzing multi-dimensional data, comprising:
   obtaining an original set of data comprising a multidimensional set of objects having a sequential order and multiple original dimensions, each object having a corresponding set of attributes;
   forming, using said original set of data, one or more new sequences of objects, each new sequence comprising an ordered set of objects, each object capturing an optimization criteria comprising both a local importance of each dimension across the sequence and a global importance of the dimension across all sequences of the original data set;
   generating, using said one or more new sequences of objects, a many-to-one mapping of objects from the multiple original dimensions to a set of topics that summarize the original set of data; and
   transforming, using the set of topics of the many-to-one mapping, the original set of data into a new set of data comprising a summarized sequence of objects having fewer dimensions than the original set of data, while preserving, within a defined edit-distance similarity measure, the sequential order of the original set of data, wherein transforming comprises performing dimensionality reduction on the original set of data according to the many-to-one mapping of objects from the multiple original dimensions to the topics, said many-to-one mapping comprising collapsing adjacent objects in the original set of data to reduce a size of the summarized sequence of objects.

2. The computer-implemented method according to claim 1, wherein the selecting a plurality of topics includes:
   identifying a plurality of attributes, each of the attributes having a number of the original dimensions; and
   selecting the one of the attributes with the largest number of the original dimensions.

3. The computer-implemented method according to claim 1, wherein the producing a many-to-one mapping from the original dimensions to the topics includes treating each of the original dimensions as a singleton cluster, and successively merging pairs of the clusters.

4. The computer-implemented method according to claim 3, wherein the successively merging pairs of the clusters includes successively merging the pairs of the clusters until all clusters have been merged into a single cluster that contains all the original dimensions to create a hierarchy including a multitude of leaf nodes and a root node, each of the leaf nodes representing one of the original dimensions, and the root node representing said single cluster, and the hierarchy further including a plurality of levels between the leaf nodes and the root node, and each of the levels of the hierarchy including a plurality of clusters formed by merging the clusters at a higher level of the hierarchy.

5. The computer-implemented method according to claim 4, wherein the performing dimensionality reduction on the original set of data further include cutting the hierarchy at one of the levels to obtain a selected number of the clusters.

6. The computer-implemented method according to claim 5, wherein the cutting the hierarchy at one of the levels to obtain a selected number of the clusters includes finding a minimum similarity threshold so that a distance between any two dimensions in the same cluster is no more than said similarity threshold and no more than the selected number of clusters are formed at said one of the levels.

7. A system for analyzing multidimensional data, comprising:
   one or more processors; and
   a memory coupled to the one or more processors;
   said one or more processors configured for:
      obtaining an original set of data comprising a multidimensional set of objects having a sequential order and multiple original dimensions, each object having a corresponding set of attributes;
      forming, using said original set of data, one or more new sequences of objects, each new sequence comprising an ordered set of objects, each object capturing an optimization criteria comprising both a local importance of each dimension across the sequence and a global importance of the dimension across all sequences of the original data set;
      generating, using said one or more new sequences of objects, a many-to-one mapping of objects from the multiple original dimensions to a set of topics that summarize the original set of data; and
      transforming, using the set of topics of the many-to-one mapping, the original set of data into a new set of data comprising a summarized sequence of objects having fewer dimensions than the original set of data, while preserving, within a defined edit-distance similarity measure, the sequential order of the original set of data, wherein the transforming comprises performing dimensionality reduction on the original set of data according to the many-to-one mapping from the multiple original dimensions to the topics, said many-to-one mapping comprising collapsing adjacent objects in the summary sequence to reduce a size of the summarized sequence of objects.

8. The system according to claim 7, wherein the selecting a plurality of topics includes:
   identifying a plurality of attributes, each of the attributes having a number of the original dimensions; and selecting the one of the attributes with the largest number of the original dimensions.

9. A computer program product for analyzing multidimensional data, the computer program product comprising a computer readable storage medium having program instructions embodied therewith, the program instructions executable by a processor to cause the processor to:
obtain, by the processor, an original set of data comprising a multidimensional set of objects having a sequential order and multiple original dimensions, each object having a corresponding set of attributes;
form, using said original set of data, one or more new sequences of objects, each new sequence comprising an ordered set of objects, each object capturing an optimization criteria comprising both a local importance of each dimension across the sequence and a global importance of the dimension across all sequences of the original data set;
generate, using said one or more new sequences of objects, a many-to-one mapping of objects from the multiple original dimensions to a set of topics that summarize the original set of data; and
transform, using the set of topics of the many-to-one mapping, the original set of data into a new set of data comprising a summarized sequence of objects having fewer dimensions than the original set of data, while preserving, within a defined edit-distance similarity measure, the sequential order of the original set of data, wherein the transforming comprises performing dimensionality reduction on the original set of data according to the many-to-one mapping of objects from the original dimensions to the topics, said many-to-one mapping comprising collapsing adjacent objects in the original set of data to reduce a size of the summarized sequence of objects.

10. The computer program product according to claim 9, wherein the select a plurality of topics includes:
identifying a plurality of attributes, each of the attributes having a number of the original dimensions; and
selecting the one of the attributes with the largest number of the original dimensions.

11. The computer-implemented method according to claim 1, wherein to generate a many-to-one mapping of objects from the multiple original dimensions to a set of topics, said one or more processors are further configured to: form an optimization model as a constrained optimization problem of finding an optimal many-to-one mapping from original dimensions to topics and solving said constrained optimization problem to generate said set of topics.

12. The computer program product according to claim 9, wherein to generate a many-to-one mapping of objects from the multiple original dimensions to a set of topics, the program instructions executable by a processor further cause the processor to: form an optimization model as a constrained optimization problem of finding an optimal many-to-one mapping from original dimensions to topics and solving said constrained optimization problem to generate said set of topics.

13. The computer-implemented method according to claim 1, wherein to obtain a local importance of each dimension across the sequence, the method further comprises: measuring a frequency of an object in one specific sequence order.

14. The computer program product according to claim 9, wherein to obtain a local importance of each dimension across the sequence, the program instructions executable by a processor further cause the processor to: measure a frequency of an object in one specific sequence order.

15. The computer-implemented method according to claim 1, wherein the preserving, within a defined edit-distance similarity measure, the sequential order of the original set of data ensures a distance between objects in the summarized sequence of objects is less than or equal to the distance between objects in the original data set.

16. The computer program product according to claim 9, wherein the preserving, within a defined edit-distance similarity measure, the sequential order of the original set of data ensures a distance between objects in the summarized sequence of objects is less than or equal to the distance between objects in the original data set.

* * * * *